United States Patent [19]
Hallman et al.

[11] Patent Number: 5,800,904
[45] Date of Patent: Sep. 1, 1998

[54] EMBOSSABLE SURFACE COVERING WITH INORGANIC WEAR LAYER

[76] Inventors: Robert A. Hallman, 114 N. Market Ave., Mount Joy, Pa. 17552; Robert D. Hensel, 227 N. Charlotte St., Millersville, Pa. 17551; Eugene M. Kirchner, P.O. Box 2, Maytown, Pa. 17550; Jeffrey S. Ross, 327 N. Mary St.; Jerome D. Wisnosky, 1624 Colonial Manor Dr., both of Lancaster, Pa. 17603

[21] Appl. No.: 143,384

[22] Filed: Oct. 29, 1993

Related U.S. Application Data

[63] Continuation-in-part of Ser. No. 813,669, Dec. 27, 1991, abandoned.

[51] Int. Cl.$^6$ .................. B32B 3/28; B32B 18/00
[52] U.S. Cl. .................. 428/156; 428/159; 428/161; 428/164; 428/168; 428/204; 428/207; 428/522; 428/480; 428/430; 428/441; 428/442; 428/698; 428/702; 428/704; 428/217; 428/337; 428/339; 428/334; 428/335; 428/215; 428/908.8
[58] Field of Search .................. 428/156, 159, 428/161, 164, 168, 204, 207, 522, 480, 430, 441, 442, 698, 702, 704, 908.8, 217, 337, 339, 334, 335, 215

[56] References Cited

U.S. PATENT DOCUMENTS

| | | | |
|---|---|---|---|
| 3,131,116 | 4/1964 | Pounds | 428/908.8 |
| 3,953,639 | 4/1976 | Lewicki, Jr. | 428/158 |
| 4,260,717 | 4/1981 | Ehrhart | 528/59 |
| 4,405,657 | 9/1983 | Miller, Jr. et al. | 428/908.8 |
| 4,418,109 | 11/1983 | Miller, Jr. et al. | 428/908.8 |
| 4,421,782 | 12/1983 | Bolgiano et al. | 427/53.1 |
| 4,781,987 | 11/1988 | Bolgiano et al. | 428/424.6 |
| 4,983,466 | 1/1991 | Witman | 428/483 |
| 5,003,026 | 3/1991 | Ehrhart et al. | 528/49 |
| 5,023,140 | 6/1991 | Glotfelter et al. | 428/447 |
| 5,077,112 | 12/1991 | Hensel et al. | 428/457 |
| 5,093,185 | 3/1992 | Ungar et al. | 428/908.8 |
| 5,188,876 | 2/1993 | Hensel et al. | 428/76 |

*Primary Examiner*—William P. Watkins, III

[57] ABSTRACT

A composite surface covering includes a substrate and an inorganic wear layer. The composite surface covering retains its performance characteristics after mechanical embossing. Preferably, the inorganic wear layer of the surface covering is deposited on the substrate by a reduced pressure environment vapor deposition technique. Preferably, the inorganic wear layer is aluminum oxide. The preferred substrate is a plastic material.

18 Claims, 1 Drawing Sheet

EMBOSSABLE SURFACE COVERING WITH INORGANIC WEAR LAYER

This application is a continuation-in-part of application Ser. No. 07/813,669, filed Dec. 27, 1991 now abandoned.

FIELD OF THE INVENTION

The present invention relates to an embossable surface covering, articles including the embossable surface covering, and a method for making the embossable surface covering. More particularly the invention relates to a flexible, embossable, surface covering including an inorganic wear layer and a support for the inorganic wear layer. The surface covering may be a decorative laminate which may be used in floor covering applications. The inorganic wear layer on the flexible, embossable, surface covering support is preferably prepared using a reduced pressure environment technique. The most preferred reduced pressure environment technique is electron beam (e-beam or EB) evaporation.

Further, the invention is directed to a multilayered surface covering in which the inorganic surface layer, despite having been subjected to manufacturing and converting processes, contributes substantially to the wear resistance performance of the entire body, and to the appearance retention of images and decorative effects generated by or in combination with subsurface layers.

BACKGROUND OF THE INVENTION

Floor coverings having surface coverings suitable for wear layers are well known in the art. Such wear layers protect the decorative elements within the floor covering composite and lengthen its useful life. Improvements in the ability of a floor covering composite to retain its original, or "like new" appearance can substantially increase the marketability of a floor product, and give end users a higher degree of satisfaction with the product. Therefore, the floor coverings industry has sought to improve the appearance retention properties of its products while maintaining the capability to process and manufacture those products on standard industrial converting equipment.

One goal of the floor covering industry has been to create a floor product that has all the advantages of resilient floors, and the wear resistance and appearance retention of ceramic tile. Such a performance breakthrough was approached with the help of inorganic wear layers, using technology described in commonly owned and copending U.S. application Ser. No. 679,306, filed Apr. 2, 1991, now Hensel et al. U.S. Pat. No. 5,188,876, issued Feb. 23, 1993, which is a continuation-in-part of U.S. Ser. No. 507,875, filed Apr. 4, 1990, now Hensel et al. U.S. Pat. No. 5,077,112, issued Dec. 31, 1991, both of which are incorporated herein by reference.

Typically, inorganic materials are not used as the wear surfaces of resilient floor coverings. In fact, most wear layer surfaces, including those for floor covering applications, are organic materials which may contain varying amounts of inorganic materials. Thus, an inorganic component of an organic wear layer may be substantially colorless so that while acting as, for example, a reinforcing agent for an organic binder material, it does not interfere with decorative effects associated with other portions of the floor covering composite. Also, inorganic materials may be of specified color or shape so as to impart a decorative effect, e.g., as a pigment or reflecting element, while also serving another function, for example, as a reinforcing agent.

Thin hard, inorganic materials, by themselves, are typically considered to be too brittle to be walked on; particularly if a "thin" layer of such a material were to be placed over a flexible or conformable support layer. However, hard inorganic materials are well known in the art as kiln-fired wear layers for rigid bodies such as ceramic tile. In addition, metal-based tile structures with thick kiln-fired inorganic wear layers have been described for both wall and floor applications. Very recently, extremely thin inorganic wear layers, as described in Hensel et al. U.S. Pat. No. 5,188,876, were discovered to impart wear enhancements to composite materials. In such materials, the inorganic wear layer is applied on top of any texture or decorative features.

Unknown until this application, are tile, and other products, that are comprised substantially of organic polymeric materials and have embossed, thin hard inorganic surfaces as the wear layer. That advancement was demonstrated employing reduced pressure environment technology to form hard, inorganic wear layers onto organic polymeric materials.

Reduced pressure environment techniques for depositing films of hard inorganic materials include sputtering, plasma polymerization, physical vapor deposition, chemical vapor deposition, ion plating and ion implantation. These techniques, are well known, and their use and application has been described in a number of handbooks, including: "Handbook of Thin Film Technology," L. I. Maissel and R. Glang, eds., McGraw Hill Book Co., N.Y., N.Y. (1970); "Deposition Technologies for Films and Coatings, Developments and Applications," R. F. Bunshah, ed., Noyes Publications, Park Ridge, N.J. (1982); and "Thin Film Processes," J. L. Vossen and W. Kern, eds., Academic Press, N.Y., N.Y. (1978).

Hard inorganic materials which can be prepared using these techniques include metals, metal oxides, metal nitrides and mixtures thereof. A critical review of vapor deposition technology related to hard coatings was presented by J. E. Sundgren and H. T. C. Hentzell in *J. Vac. Sci. Tech.* A4(5), September/October 1987, 2259–2279.

While reduced pressure environment techniques have been used to form hard inorganic coatings on many surfaces, including tool parts such as bits, blades, and bearings, aircraft and automobile engine parts, lighting fixtures for industrial, residential and automotive use, and in a variety of lens applications, there has been no suggestion that such coatings could be successfully used as a wear layer for a flexible, embossable floor covering or other flexible support structure.

In fact, hard, non-particulate inorganic coatings are known to be brittle even when applied as very thin layers. Thus, one skilled in the flooring art would not expect hard inorganic materials, even when deposited by reduced pressure environment techniques, to function adequately on a flexible or embossed floor covering or on other support surfaces which are flexible or embossed, particularly in the thicknesses deemed necessary to protect the decorative layer. It was believed that flexing or embossing would create unacceptable cracking, i.e. cracks which would be noticeable, reduce gloss level, or lead to unacceptable staining.

As described in the prior art and known to those of ordinary skill in the art, the reduced pressure environment technique applied layers are non-particulate, i.e. not minute separate particles.

Hard inorganic materials, deposited by reduced pressure environment techniques, have found application as protective surfaces for organic polymeric materials in many technological areas, and that fact is largely responsible for the wide variety of coating/substrate combinations and deposition techniques discussed in the above-mentioned references. Examples include:

Lens Applications—where, a very thin layer, or stack of thin layers, of total thickness less than one micron, of an inorganic material is applied to a rigid plastic substrate in order to provide an anti-reflection or light filtration coating. The coating may also provide increased wear protection for the plastic lens, or a decorative effect. Additionally, the inorganic coating must be initially prepared in a crack-free state, and must remain free of cracks and other defects which could cause deterioration of the optical properties of the coated lens.

Window Applications—where, inorganic coatings are applied for the purpose of protecting the rigid plastic from abrasive wear, or as interference coatings (e.g., for heat reflection or transmission). Such products would have broad application in the automotive and aircraft window markets, and in architectural applications, especially as replacements for glass parts. It is important that the product not have, or develop during normal use, visible surface defects, such as formation of haze, which could detract from the overall transmission quality of the window.

Packaging applications—where, a packaging material comprising a flexible organic polymeric sheet with a surface consisting substantially of a transparent inorganic material, can be prepared by reduced pressure environment technique. For these products, the function of the inorganic protective layer is as a barrier layer with an improved aesthetic quality. Thus, while imparting improved barrier properties to a package, the material would permit observation of the material inside the package, or of a decorative element incorporated into the packaging composite. An extremely important characteristic of the transparent inorganic material in such a packaging composite is that the inorganic layer be substantially free from cracks, fractures or other defects. Obviously, such defects would degrade of the barrier characteristic of the packaging composite. The current state of the art for packaging applications is to form a packaging laminate with the inorganic layer, one tenth micron or less in thickness, sandwiched between two other layers consisting substantially of organic polymers. It has been found that even on flexing, the overall composite maintains improved barrier properties, probably because the organic polymer laminate layers seal the damaged areas of the internal inorganic barrier layer.

Optical and Magnetic Data Storage Media Applications—where, a product comprising a plastic base, an inorganic or organic/inorganic composite data storage media layer, and an additional protective inorganic surface layer is provided. For these applications, other criteria such as a minimal interference between the magnetic or optical properties of the inorganic protective layer and the data storage media layer are desired. Also, cracking and defects in the inorganic protective layer can deteriorate product performance level causing loss of stored data. The inorganic protective layer is less than one micron in thickness.

Highly desirable, especially in the floor covering industry, but not intended to be limited to floor coverings only, is a product structure that: contains an inorganic surface layer which could assist in appearance retention of the structure; is flexible so as to permit processing using standard industrial converting equipment, including but not intended to be limited to mandrels, printing stations, lamination equipment, embossing equipment, winding and slitting equipment, and the like; is transparent to permit visualization of decorative elements when used as the surface covering of a composite body; and will provide for enhanced wear and appearance retention, even after processing of the product structure into a decorative laminate, such as a floor covering, causes the formation of fractures, cracks, or other faults in the inorganic surface layer, and most especially even if decorative laminate is exposed to an extreme environment, such as in a floor covering application.

SUMMARY OF THE INVENTION

An object of this invention is to provide a resilient and/or flexible material with a non-particulate inorganic surface covering.

Also, an object of the invention is to provide a layered composite having a non-particulate inorganic surface layer that retains its appearance retention characteristics after being subjected to lamination and embossing processes necessary to form the layered composite structure.

Another object is to provide a resilient and/or flexible material with a non-particulate inorganic surface covering that imparts to the resilient and/or flexible material, improvements in appearance retention such as improved stain resistance and improved gloss retention.

A further object of the invention is to provide a resilient and/or flexible material with the above properties, in which the resilient and/or flexible material comprises an organic material such as a plastic sheet or film, and in which the inorganic surface covering comprises a inorganic oxide layer.

A still further object of this invention is to provide a resilient and/or flexible material with the above properties, in which the thickness of the resilient and/or flexible material can be between 10 microns thick and 2 cm thick, and in which the inorganic layer is between 1 micron thick and 25 microns thick.

A further object of the invention is to provide a resilient and/or flexible material with the above properties, in which the resilient and/or flexible material with the inorganic surface coating has substantially the same transmission in the visible portion of the electromagnetic spectrum as does a resilient and/or flexible material of identical composition, but with no inorganic surface coating.

Elements from which hard, substantially transmissive, inorganic surface layers can be prepared include aluminum, silicon, zirconium, titanium, carbon, magnesium, yttrium, and tantalum. Typically, the inorganic surface layers with the most preferred properties are formed in binary, ternary, or higher order combination of one or more of the above elements with additional elements including oxygen, nitrogen, or halides. Often small amounts of other elements are incorporated into the surface layer due to their presence as impurities in the reduced pressure process environment used to prepare the inorganic surface layer. In addition, other elements can be intentionally introduced to the reduced pressure environment used to prepare the inorganic coating, for the purpose of improving processing for a cost advantage, or to modify some physical property of the inorganic film. In particular, volatile or liquid organic, organic-inorganic, and inorganic materials may be readily introduced. The preferred inorganic surface coverings are not necessarily stoichiometric, but are believed to be close to stoichiometric. The most preferred material is aluminum oxide.

Resilient materials for the present invention include all organic polymeric materials which can be subjected to deformation with substantial recovery. Preferably resilient materials are substantially transmissive in the visible portion of the electromagnetic spectrum; are formulated so that they can be processed using standard converting industry equipment; and can be exposed to a reduced pressure atmosphere environment so as to permit application of an inorganic layer of the above mentioned quality and thickness. A preferred set of organic polymeric materials include those comprising polyethylene terephthalate, polybutylene terephthalate, polyethylene-2,6-naphthalate, polyethylene, polypropylene, polyethersulfone, certain highly transmissive polyimides, polycarbonate, poylvinylchloride, and several thermosetting and composite materials such as those described in U.S. patent Ser. Nos. 5,003,026; 4,983,466; 4,781,987; 4,421,782; and 4,260,717. A highly preferred organic substrate material is polyethylene terephthalate.

An additional preferred support comprises one of the above organic polymeric materials which has been additionally treated by means of a pigmentation step, printing step, or by the addition of particulate dispersions so as to impart an image to, or to otherwise provide a decorative appearance to, the organic polymeric material.

An additional preferred support comprises one of the above organic polymeric materials, additionally treated as described above, or untreated and remaining substantially transmissive in the visible portion of the electromagnetic spectrum, and further treated by means of a corona, arc, plasma, or by solvent or aqueous based coating methods, on one or both sides, so as to provide for adhesion between the organic polymeric material and either the inorganic surface layer, or an additional body such as a floor tile, counter top, window, wall tile, or other architectural accessory, or both.

The resilient and/or flexible material described above, and articles comprising that resilient and/or flexible materials are well suited as improvements over current articles that are currently marketed in the floor coverings industry. However, this invention is not intended to be limited to floor coverings, but rather to have broad application in general to embossed or flexible articles for which substantial improvements in appearance retention are desired, relative to articles of identical composition with no inorganic surface layer, or relative to articles of identical composition, but with surface layers comprised substantially of organic polymeric materials. Some examples, not intended to be limiting in any way on the scope of this invention are articles which may be prepared in the form of counter or desk tops, wall coverings, ceilings elements such as grid pieces or tile, window frames or transparent appliques, restorative films, automotive parts, furniture, composite gasket materials, and textile fibers.

DETAILED DESCRIPTION OF INVENTION

Figure 1:
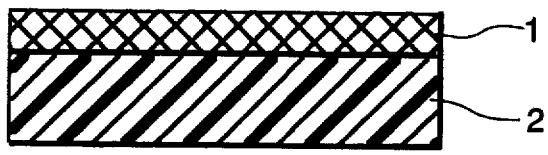
FIG. 1 is a cross-sectional view of a first embodiment of the present invention.

Referring to FIGS. 1 to 4, which disclose different embodiments of this invention, layer 1 comprises the inorganic surface layer, and is typically referred to as the wear layer. Layer 2 comprises an organic polymer material onto which the inorganic surface layer 1 is typically deposited by a reduced pressure environment technique. Layer 2 is typically known as the substrate film or carrier layer. Layer 3 comprises an organic polymer material, and may also include, but not be limited to such materials as often constitute the support layer or backing sheet of a typical resilient flooring product. In this context, the term resilient when used in reference to a flooring product is intended to include sheet flooring materials, and tile flooring materials. Layers 4 and 5 comprise inorganic and organic materials typically used in adhesive formulations, key coatings, and in pigments for decorative printing processes, or they may comprise the surfaces that result from processes such as glow discharge cleaning, ion bombardment, corona arc, or UV light treatments, and their order is interchangeable.

The Wear Layer

The wear layer is typically formed by a reduced pressure environment technique, most preferably by a physical vapor deposition (PVD) technique, including sputtering, evaporation or plasma spraying. The most preferred PVD technique is electron beam evaporation with an ion assist. The ion assist may be provided by a number of methods including sputtering, activated reactive evaporation, or by using an ion source such as a cold cathode ion source, a hot filament ion source, an electron cyclotron resonance source, or any of a large number of available ion or plasma sources. The preferred gases for the above processes are oxygen, nitrogen, argon and mixtures thereof.

Typically, the wear layer is formed by placing a sample of the desired substrate into the reduced pressure environment chamber, evacuating the chamber to or below the process pressure, initiating the deposition process, operating the equipment to obtain the desired thickness, stopping the process, and then returning the equipment to atmosphere. The reduced pressure environment chamber may be any of such type as is typically used for industrial processing of plastic articles, including bell jar, box, drum, or load-lock type batch coaters, in-line coaters, or web coaters.

The wear layer thickness is typically between 1 and 25 microns thick, most preferably between 2 and 10 microns thick. The wear layer may be any hard transparent inorganic oxide, inorganic nitride or oxynitride. The preferred inorganic oxides, nitrides and oxynitrides are those that are highly transmissive in the visible portion of the electromagnetic spectrum, and also are hard. Some elements from which such inorganic oxides, nitrides, and oxynitrides may be derived include Al, Si, Mg, Ca, Ti, B, Zr and Hf. Due to the high degree of optical transmission and high hardness, oxides, nitrides and oxynitrides comprising primarily Al are preferred.

Although the present inventors do not wish to be limited by any theory of the relationship between hardness and wear or appearance retention, those skilled in the art have often referred to the hardness of a coating as indicative of its ability to improve wear or appearance retention. In that context, the inventors offer the following preferences regarding desirable hardness of an applied inorganic surface layer.

The hardness is preferably such that the hardness of a bulk material of similar composition as the inorganic surface layer is greater than a Mohs value of 6, more preferably greater than 8, and most preferably greater than 9 on the Mohs scale. Even more preferable, however, is to measure the actual hardness of the film using a nanoindentation device such as that offered for use to the public by Oak Ridge National Laboratories. Using such an instrument, at indentation depths of 300 nm, a preferred hardness value for a deposited wear layer is greater than 3 gigapascals, with a more preferred value greater than 7 gigapascals, and most preferably greater than 10 gigapascals.

Typical polymers have hardnesses of less than 0.5 gigapascals. Therefore, any wear layer having a hardness of greater than 0.5 gigapascals would improve appearance retention.

The transparency of the inorganic oxide should be in most cases such that when the oxide is applied to the substrate layer, the change in total color as defined by the CIELAB definition of total delta-E is less than 15 units, and most preferably less than 5 units. However, in some cases it is desirable to deposit a wear layer that has a decorative effect associated with it, and in such cases it is not necessary to meet the total delta-E requirement.

The inorganic material is preferably selected from the group of inorganic oxides including, $SiO_2$, $Al_2O_3$, $ZrO_2$, $TiO_2$, $Y_2O_3$, MgO and $Ta_2O_5$. The most preferable being $Al_2O_3$, or mixtures of $Al_2O_3$ with other materials which may be used for the purpose of modifying the evaporation characteristics of the $Al_2O_3$, or modifying the properties of the final coating. Also permitted is the use of nitrides of the above materials, such as $Si_3N_4$, AlN, ZrN and TiN, especially in the case of transparent nitrides such as from Al or Si. Also permitted are mixtures of nitrides and oxides, especially those comprising Si and Al, and Mg and Zr.

The Substrate Layer

The substrate layer may be any of a broad class of organic polymeric materials that can withstand the vacuum environment required to deposit an inorganic surface layer. The substrate is a flexible and embossable film. The most preferable films are any of a number of polyvinyl chloride (PVC) films currently used in the floor coverings industry, either as wear layers, or as support layers for applied wear layers. The most preferred thermoplastic film is low plasticizer content polyvinyl chloride film, such as is manufactured by NANYA. Additional thermoplastic films such as polyethylene terephthalate (PET) are also highly preferred. Surprisingly, after coating with the inorganic surface layer, PVC, PET and a number of other organic polymeric materials can be embossed. More surprisingly, as further illustrated in the examples following, such embossed structures exhibit good stain and soil resistance, and retain their gloss resistance substantially longer than the same materials with no inorganic surface coating. This invention explicitly covers the use of thermoset films such as urethanes, acrylates, polyesters, epoxies, silicate network polymers, organically modified silica sol-gel composites, and similar materials.

The Support Layer

The support layer may be any of the class of filled or unfilled organic polymeric materials that are typically used as support structures in the floor products industry, for the manufacture of sheet goods, tile, or other substrates such as wall, ceiling or laminate structures. Examples of such support structures include leathers, woven and non-woven fabrics and felts, papers, cardboard, Formica, fiber and chipboards, natural materials such as slate, marble and wood, tyvek, linoleum, and teslin. Also, some other support structures which are not generally considered to be useful as flooring candidates, but can be used as floor covers with an embossed inorganic wear layer, include highly filled polyester thermoset resins, filled acrylates such as corean, cements (including phosphate bonded materials), and metal plates and foils.

The Decorative Layer

Decorative images may be formed on the back side of the substrate layer 2 or top side of the support layer 3 by any of a number of standard printing and decorating techniques as are well known in the art. These techniques include rotogravure printing, lithographic printing, hot stamping, dye sublimation, thermal transfer, xerography, electrostatic printing, ionographic printing, and specific modifications to these and other techniques as required to transfer a desired image to the back side of an appropriate substrate film.

The Adhesive Layer

Adhesive layers may from time to time be required so as to provide an article with intralaminar strength. In general, adhesive systems are developed which are highly specific for the particular type of layers that must be bonded. For adhesion of certain materials, such as PVC film to filled PVC support layers, often no adhesive layer is required. That is also the case for certain other low Tg polymer film materials. However, for certain untreated types of PET, such as Hoechst Celanese's HOSTAPHAN 4000 PET, an adhesive, such as Goodyear Polyester Resin PE307 in solution, maybe needed to enhance the bond between the PET and filled PVC support structures. In addition, certain types of PET, such as that sold under the trademark HOSTAPHAN 4500 by Hoechst Celanese, were found to adhere well to filled PVC support layers. However, to acquire the preferred adhesion level Armstrong's 911 lacquer was used to greatly enhance adhesion between the two materials.

Appearance Retention Testing

The test procedure used to determine whether a sample would retain its appearance were an abbreviated stain test and a walkers test. The stain test involves applying Sanford ink and iodine to the sample for a period of twenty-four hours, cleaning the samples with a basic soap solution and then isopropyl alcohol, and observing the appearance.

In the walkers test six female walkers reached a total traffic count of 1200 on six inch square samples. It is a severe test and would probably be more severe than necessary to determine whether a material would retain its original appearance in environments less hostile to decorative laminates than that of a floor products environment. For example, desk and counter top materials are not required under normal use to withstand the pressure of a particle of silica sand rotating with an additional transverse motion applied with forces equivalent to those supplied by the weight of average humans. Therefore, in the examples that follow it is reasonable to assume the degree of retention of the original appearance of a decorative laminate under conditions of exposure corresponding to those of a floor products environment can be considered as adequate to demonstrate the ability of articles formed of different basic material combinations, but with the common addition of an inorganic protective layer that is processable through standard industrial converting equipment, to survive in less severe environments.

It should be noted also that although at this time the preferred method of preparing articles protected from loss of appearance as described in the examples and above, is vapor deposition using reduced pressure environment techniques, this invention is intended to include articles which contain the inorganic surface layer but manufactured using other different techniques. It is believed that inorganic particles of the appropriate size would produce the same wear enhancement properties if the particles were applied using powder technology.

Embossing of a composite surface covering, including a substrate and an inorganic wear layer is a process in which the composite is elongated and distorted to make an irregular surface texture. Cracks in the inorganic wear layer are formed during the embossing process when the elastic limit for the wear layer is exceeded. Cantilever surface strain measurements indicate that cracking occurs at an elongation of 0.5% in a 3 micron thick $Al_2O_3$ wear layer. In a thicker wear layer of 5.6 microns, the elongation to rupture value was lower, 0.3%, which indicates a definite thickness effect. Typical embossing processes create surface texture up 30 mils thick.

When the wear layer/substrate composite is embossed, the length of the wear layer surface is elongated. The percent change in length of the wear layer surface exceeds the percent elongation to rupture of the wear layer. Therefore, the wear layer cracks. The percent elongation to rupture of the reduced pressure environment deposited wear layers of the present invention is between 0.3 and 0.7 percent. The average percent change in length of the embossed wear layers based on measurements has been calculated to be 0.8 with a maximum of 2.8 percent in any specific area.

Depending on the type of substrate on which the wear layer is deposited, cracks may or may not form in the wear layer during the deposition. Other factors which affect cracking during deposition are the type of wear layer material and the change in temperature of the substrate during deposition. The thermal coefficient of expansion of PVC is $6 \times 10^{-5}$ and the thermal coefficient of expansion of PET is $1.8 \times 10^{-5}$. If there is an 80° C. change in temperature during deposition of the wear layer, the percent change in length of the PVC is about 0.5 percent and the percent change in length of the PET is about 0.1 percent. Therefore, cracks due to thermal expansion would be expected in the wear layer being deposited on PVC but not in the wear layer deposited on the PET during deposition of the wear layer.

The initial portion of the wear layer which is deposited on the substrate is deposited before the surface of the substrate is heated. As the substrate increases in temperature, it expands and causes the initial portion of the deposited wear layer to crack. Since the flaws or weaknesses in the initial portion of the deposited wear layer are random, the cracks formed in the initial portion of the deposited wear layer are random. As, the depositing material strikes the interior surfaces of the cracks, the wear layer material builds up on the interior surfaces of the cracks. The depositing material also rounds the corners of the thermal expansion induced cracks adjacent the exposed surface of the wear layer.

Also, since the depth of the wear layer is small when the thermal expansion induced cracks form, the cracks are shallow and the depositing material strikes the surface of the substrate which is exposed when the crack forms. Therefore, a layer of wear layer material forms at the base of the crack and the crack in the wear layer heals forming a continuous wear layer.

If the wear layer is embossed after it is deposited, the cracks are formed by the increased elongation of the wear layer as it tries to conform to the edges of the embossing tool. Therefore, the cracks which tend to follow the embossing tool edges are non-random. Rather the adjacent cracks are substantially parallel. Further, the cracks formed during embossing penetrate to the substrate. Since no additional wear layer material is deposited after the embossing and crack formation, the surface of the substrate material at the base of the crack is exposed and the wear layer is discontinuous. Further, no wear layer material is deposited on the interior surfaces of the cracks and the corners of the cracks adjacent the exposed surface of the wear layer are not rounded but remain sharp.

EXAMPLE 1

This example illustrates the embodiment of FIG. 1. Plastic film substrates were securely affixed to substrate holders in a stainless steel box coater equipped with the following features: a planetary rotation substrate holder sub-assembly; an electron beam evaporator; a low voltage cold cathode ion source; a variable temperature shroud located between the substrate holders and the evaporator and containing a ten inch diameter aperture positioned above the evaporator; a pumping system capable of maintaining a pressure of $10^{-3}$ to $10^{-4}$ Torr during a coating process, and below $10^{-6}$ Torr before starting a deposition process; and the necessary view ports, power supplies, cooling lines, flow controllers, and other equipment as are usually associated with vacuum process equipment.

The chamber was evacuated, and after reaching a pressure below $10^{-5}$ Torr, the chamber was backfilled to about $10^{-4}$ Torr with oxygen. The ion source and evaporator were then energized. Opening a shutter covering the aperture started the deposition process. After application of the desired thickness, the evaporator and ion source were de-energized, the chamber vented to atmospheric pressure, and the samples removed.

EXAMPLE 2

Figure 2:
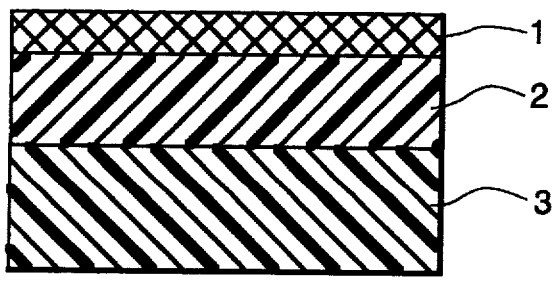
FIG. 2 is a cross-sectional view of a second embodiment of the present invention.

This example illustrates the embodiment of FIG. 2. Selected samples of Example 1 were laminated and embossed with a variable depth embossing test pattern to a base structure consisting of a limestone filled polyvinyl chloride base using a static pressure of 330 PSI at 155° C. for about 1.5 minutes. Appearance retention of the embossed structures, relative to identical structures with no inorganic surface layer, and relative to other tile structures such as those that can be prepared according to Glotfelter et al. U.S. Pat. No. 5,023,140, is improved.

EXAMPLE 3

This example illustrates the embodiment of FIG. 2. Samples of polyvinyl chloride (PVC) and polyethylene terephthalate (PET) were laminated to the base structure according to the lamination procedure for Example 2, and then placed in a reduced pressure environment vessel, and an inorganic surface layer applied as in Example 1. These samples were then embossed with a variable depth embossing test pattern, and exposed to foot traffic (Walkers Test) as described in above. The samples with the inorganic surface layer withstood the traffic longer without degradation of appearance than did identical structures with no inorganic surface layer, and longer also than structures prepared using inorganic/organic wear layers such as those described in Glotfelter et al. U.S. Pat. No. 5,023,140.

EXAMPLE 4

Figure 3:
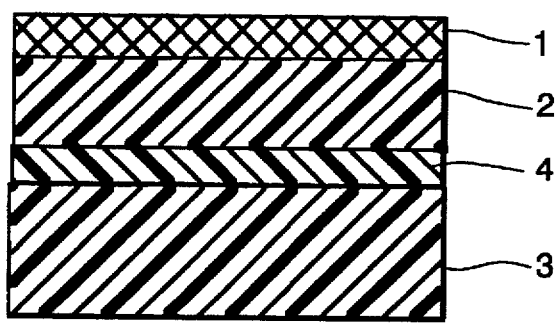
FIG. 3 is a cross-sectional view of a third embodiment of the present invention.

This example illustrates the embodiment of FIG. 3. For this example, PET samples were subjected to additional treatments to modify one or both surfaces before they were coated with an inorganic surface coating according to the method described in Example 1. One sample was a sample of 5 mil plastic film sold under the trademark MYLAR by Dupont coated with 2 mil of an acrylate copolymer hot melt adhesive. Other samples were purchased from Hoechst Celanese corporation under the trade name Hostaphan, and were PET films that were treated on one or both sides with Hoechst-Celanese's propriety adhesion promoting gravure-applied acrylate coating technology. After application of the inorganic surface treatment, the samples had good adhesion and were also seen to give better appearance retention after being exposed to a traffic environment than identical samples that had no inorganic surface treatment.

EXAMPLE 5

This example illustrates the embodiment of FIG. 3. For this example, PET samples were subjected to additional treatments to modify the surface opposite from the inorganic surface coating after the inorganic surface coating was applied according to the method described in Example 1. Two adhesive systems illustrating this embodiment include the Goodyear adhesive polyester resin PE307 and Armstrong's 911 Lacquer. The improvements in adhesion relative to examples prepared according to Example 2 are obvious by the increased pull test results. Again, an improved appearance retention was observed relative to control samples with no inorganic surface coating, and relative to samples prepared according to the procedures outlined in Glotfelter et al. U.S. Pat. No. 5,023,140.

EXAMPLE 6

This example illustrates an additional embodiment of FIG. 3. For this example, PVC films were subjected to processing steps, including rotogravure printing to establish a backprinted image on the PVC film. After formation into a decorative laminate in the form of a floor covering, the article was exposed to the conditions described for the formation of the inorganic surface layer as given in Example 1. The resulting product was found to retain its decorative appearance, even after it was embossed with a embossing test plate which contained variable depth embossing.

EXAMPLE 7

Figure 4:
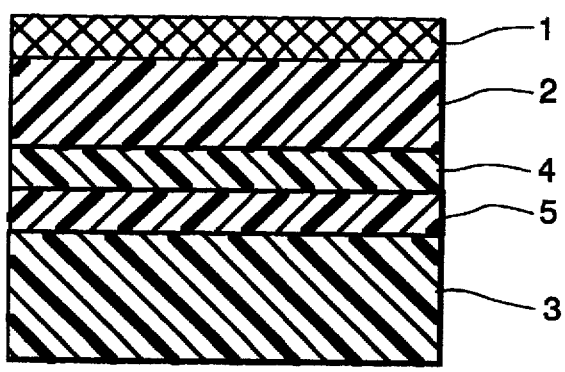
FIG. 4 is a cross-sectional view of a fourth embodiment of the present invention.

This example illustrates an embodiment of FIG. 4. A sample of PET prepared as described in Example 1 was laminated and embossed as described in Example 3 to a filled PVC base structure similar to that of Example 2, except that the base structure had been subjected to an additional processing step such that a decorative image was imprinted on the surface contacting an adhesive layer prepared as described in Example 5 and applied to the surface of the PET opposite the inorganic surface coating. This article demonstrated enhanced appearance retention relative to an identical article that did not have the applied inorganic surface layer.

| EXAMPLE No. | SUPPORT[a] | THICKNESS (mil) | COLOR | PROCESSING[b] | | |
|---|---|---|---|---|---|---|
| | | | | STEP 1 | STEP 2 | STEP 3 |
| CONTROL | PVC | 3 | CLEAR | L&E | | |
| 1, 2 | PVC | 3 | CLEAR | C | L&E | |
| 1, 2 | PVC | 3 | CLEAR | C | L&E | |
| 1, 2 | PVC | 3 | CLEAR | C | L&E | |
| 1, 3 | PVC | 3 | CLEAR | L | C | E |
| 1, 3, 6 | PVC | 3 | BRICK | L | C | E |
| 1, 2 | PVC | 3 | CLEAR | C | L&E | |
| 1, 2 | PVC | 3 | CLEAR | C | L&E | |
| 1, 2 | PVC | 3 | CLEAR | C | L&E | |
| 1, 2 | PVC | 3 | CLEAR | C | L&E | |
| CONTROL | PET | 5 | CLEAR | L&E | | |
| 1, 2, 4 | PET | 5 | CLEAR | C | L&E | |
| 1, 2, 4 | PET | 5 | CLEAR | C | L&E | |
| 1, 2, 4 | PET | 5 | CLEAR | C | L&E | |
| 1, 2, 7 | PET | 5 | CLEAR | C | L&E | |
| 1, 2 | PC | 8 | CLEAR | C | L&E | |
| 1, 2 | PVA | 2 | CLEAR | C | L&E | |
| 1, 2 | PViC | 1 | CLEAR | C | L&E | |
| 1, 2 | UA | 2–3 | CLEAR | C | L&E | |
| 1, 2 | U | 3–4 | CLEAR | C | L&E | |

| EXAMPLE No. | ION ASSIST | THICKNESS (u) | FILM | EVALUATIONS[c] PERFORMED | APPEARANCE[d] RETENTION AFTER EMBOSSING | APPEARANCE RETENTION AFTER TRAFFICKING |
|---|---|---|---|---|---|---|
| CONTROL | NO | 0.0 | CONTROL | WT | YES | NO |
| 1, 2 | YES | 4.3 | AL2O3 | S, WT | YES | YES |
| 1, 2 | YES | 4.8 | AL2O3 | S, WT | YES | YES |
| 1, 2 | NO | 4.2 | AL2O3 | S, WT | YES | YES |
| 1, 3 | YES | 3.3 | AL2O3 | S, WT | YES | YES |
| 1, 3, 6 | YES | 3.5 | AL2O3 | WT | YES | YES |
| 1, 2 | YES | 0.1 | AL2O3 | | YES | — |
| 1, 2 | YES | 2.0 | AL2O3 | | YES | — |
| 1, 2 | YES | 0.1 | SiOx | | YES | — |
| 1, 2 | YES | 4.0 | SiOx | | YES | — |
| CONTROL | NO | 0.0 | CONTROL | S, WT | YES | NO |
| 1, 2, 4 | YES | 3.7 | AL2O3 | S, WT | YES | YES |
| 1, 2, 4 | NO | 4.3 | AL2O3 | S, WT | YES | YES |
| 1, 2, 4 | NO | 4.0 | SiOx | WT | YES | YES |
| 1, 2, 7 | YES | 3.7 | AL2O3 | | YES | — |
| 1, 2 | YES | 5.0 | AL2O3 | | YES | — |
| 1, 2 | YES | 5.0 | AL2O3 | | YES | — |
| 1, 2 | YES | 5.0 | AL2O3 | | YES | — |

| | | | | | |
|---|---|---|---|---|---|
| 1, 2 | YES | 5.0 | AL2O3 | YES | — |
| 1, 2 | YES | 5.0 | AL2O3 | YES | — |

[a]PVC = Polyvinyl chloride, PET = Polyethylene terephthalate, PC = Polycarbonate, PVA = Polyvinyl Acetate, PViC = Polyvinlylidene chloride, UA = UV cured Urethane acrylate, U = Moisture cured Urethane
[b]L = Laminated, E = Embossed, C = Coated
[c]WT = WALKER TEST, S = STAIN TEST
[d]Appearance retention after embossing and stain test, if stain tested

We claim:

1. A surface covering composite comprising a substrate and a non-particulate inorganic wear layer, the wear layer being deposited on the substrate by a reduced pressure environment technique and then the composite being embossed, the deposited and embossed wear layer having a plurality of cracks on the exposed surface, a majority of the cracks forming a non-random pattern.

2. The surface covering composite of claim 1, wherein the composite is mechanically embossed.

3. The surface covering composite of claim 1, wherein the non-particulate inorganic wear layer is deposited on the substrate by a reduced pressure environment technique selected from the group consisting of sputtering, plasma polymerization, physical vapor deposition chemical vapor deposition, ion plating and ion implantation.

4. The surface covering composite of claim 1, wherein the non-particulate inorganic wear layer comprises an inorganic material selected from the group consisting of inorganic oxides, inorganic nitrides, and inorganic oxynitrides.

5. The surface covering composite of claim 4, wherein the inorganic material of the non-particulate inorganic wear layer is selected from the group consisting of aluminum oxide, silicon oxide, aluminum nitride, silicon nitride and titanium nitride.

6. The surface covering composite of claim 5, wherein the inorganic material of the non-particulate inorganic wear layer is aluminum oxide.

7. The surface covering composite of claim 6, wherein the substrate is a plastic material.

8. The surface covering composite of claim 1, further comprising a support, the substrate being laminated to the support.

9. The surface covering composite of claim 8, further comprising particles interposed between the wear layer and the support, the particles capable of deforming the wear layer when the wear layer is laminated to the support.

10. The surface covering composite of claim 1, wherein the inorganic wear layer is substantially transparent.

11. The surface covering composite of claim 1, wherein the non-particulate inorganic wear layer comprises a material having a bulk hardness of at least 6 Mohs.

12. The surface covering composite of claim 1, wherein the non-particulate inorganic wear layer has a nanoindentation hardness of at least 3 gigapascals.

13. A floor covering comprising the surface covering composite of claim 1.

14. The surface covering of claim 1, wherein the wear layer consists of inorganic material.

15. The surface covering composite of claim 1, wherein the majority of the cracks are substantially parallel to an adjacent crack.

16. A surface covering composite comprising a substrate and a non-particulate inorganic wear layer, the wear layer being deposited on the substrate by a reduced pressure environment technique and then the composite being embossed, the wear layer having cracks, the majority of which cracks penetrate to the substrate whereby the wear layer is discontinuous.

17. A surface covering composite comprising a substrate and a non-particulate inorganic wear layer, the wear layer being deposited on the substrate by a reduced pressure environment technique and then the composite being embossed, the wear layer having cracks, the majority of which cracks have sharp corners adjacent the exposed surface of the wear layer.

18. A surface covering composite comprising a substrate and a non-particulate inorganic wear layer, the wear layer being deposited on the substrate by a reduced pressure environment technique and then the composite being embossed, the wear layer having cracks, the majority of which cracks have interior surfaces which are not built up with deposited wear layer material.

* * * * *